United States Patent [19]
Masreliez

[11] Patent Number: 5,406,053
[45] Date of Patent: Apr. 11, 1995

[54] HEATING PROBE HAVING A HEATED TIP FORMING A THERMOCOUPLE

[76] Inventor: C. Johan Masreliez, 3301 181st Pl. NE., Redmond, Wash. 98052

[21] Appl. No.: 99,059

[22] Filed: Jul. 29, 1993

[51] Int. Cl.⁶ .......................... H05B 1/00; H05B 3/02
[52] U.S. Cl. ..................................... 219/241; 219/229
[58] Field of Search .............. 219/221, 227, 229, 233, 219/235, 236–241

[56] References Cited

U.S. PATENT DOCUMENTS

| | | | |
|---|---|---|---|
| 433,671 | 8/1890 | Carpenter | 219/239 |
| 1,293,320 | 2/1919 | Braun | 219/239 |
| 1,589,843 | 6/1926 | De Lisle | 219/237 X |
| 2,717,952 | 9/1955 | Dvorak | 219/241 X |
| 2,747,074 | 5/1956 | Finch | 219/241 X |
| 2,897,335 | 7/1959 | Finch | 219/241 X |
| 3,141,087 | 7/1964 | Schoenwald | 219/233 |
| 3,654,427 | 4/1972 | Schoenwald | 219/241 |
| 4,527,560 | 7/1985 | Masreliez | 219/241 X |
| 4,822,979 | 4/1989 | deKam | 219/241 |
| 5,043,560 | 8/1991 | Masreliez | 219/241 X |
| 5,122,637 | 6/1992 | Bottorff et al. | 219/241 |

FOREIGN PATENT DOCUMENTS

| | | | |
|---|---|---|---|
| 133060 | 6/1949 | Australia | 219/238 |
| 549862 | 11/1922 | France | 219/237 |
| 968814 | 12/1948 | France | 219/240 |
| 219701 | 3/1985 | German Dem. Rep. | 219/241 |
| 522942 | 4/1943 | United Kingdom | 219/236 |
| 628657 | 9/1949 | United Kingdom | 219/237 |
| 633020 | 12/1949 | United Kingdom | 219/237 |
| 1252095 | 8/1986 | U.S.S.R. | 219/241 |

Primary Examiner—Bruce A. Reynolds
Assistant Examiner—John A. Jeffery
Attorney, Agent, or Firm—Seed and Berry

[57] ABSTRACT

A heated probe and sensor tip incorporating a thermocouple located near the distal end of the probe. Improved temperature monitoring and control are achieved through placement of a thermocouple at or near the heating surface. In one embodiment of the device, the heating tip surface forms one half of a thermocouple junction. In another embodiment, a spiral resistive ribbon is formed integrally with the tip and comprises a resistive heating element. In an alternative embodiment of the device, a replaceable tip is described. A method for producing the device is also described. The thermocouple is preferably formed by the junction between the heating tip and a heating wire that surrounds the tip. The tip is preferably mounted in an insulative body which is, in turn, mounted at the distal end of a conductive support tube. Power is then delivered to the heating wire through the support tube and a lead connected to the heating tip. The electrically conducted support tube and a proximal portion of the heating tip are preferably enclosed by an outer tube having an end wall that contacts the heating tip so that the distal end of the heating tip projects beyond the end wall.

3 Claims, 2 Drawing Sheets

HEATING PROBE HAVING A HEATED TIP FORMING A THERMOCOUPLE

TECHNICAL FIELD

The present invention relates to a heated probe incorporating a thermocouple and a method for producing an insulator-encased probe tip.

BACKGROUND OF THE INVENTION

Instruments incorporating heated probe tips are used in several fields, with such instruments including soldering irons in electronics and jewelry applications. Heated probe tips are also utilized in the jewelry industry for wax casting and in the medical field for multiple uses including cauterization.

An inherent requirement of a heated probe tip is a means for achieving a heated tip. Typical methods of heating the tip include holding the tip in a flame or in contact with a resistive heater. The most common conventional method of heating probe tips uses a resistive heating element in thermal contact with the heating tip. This method is found in the common soldering iron.

An alternative method involves passing an electric current through the probe tip such that resistive heating occurs within the probe tip itself. An example of such a device is found in U.S. Pat. No. 4,527,560, issued Jul. 9, 1985.

Maintenance of a constant or predictable tip temperature utilizing these techniques is often difficult. Heat loss frown the probe tip requires that additional heat be added over time to maintain a constant heating tip temperature. Primary sources of heat loss from a heated tip, particularly a relatively narrow tip, are heat convection along the length of the tip and radiation to the surrounding atmosphere. Additionally, heat can flow from the tip to a housing in which the tip is mounted through conduction. Heat energy is also expended through the use of the heated probe tip to perform its intended function. For example, as a soldering iron heats solder, heat flows from the heating tip to the solder and to the material to which the solder is applied. The rate at which heat is lost frown the tip, and hence the rate at which heat must be supplied to maintain a constant temperature, is generally varied and unpredictable. Thus, applying heat to the tip at a constant rate will generally not maintain the tip at a constant temperature.

These multiple heat loss mechanisms require additional heat input to the probe tip over time. Moreover, because each of the heat loss mechanisms can result in differing rates of heat loss at different points in the probe tip, temperature differentials are often found along the probe tip.

Devices utilizing the heating techniques described above present difficulties in maintaining and monitoring the temperature of the heated tip. Devices employing an eternally applied resistive heating element typically attempt to maintain a high temperature by applying heat at some distance from the distal end of the heating tip. Heating of the tip then occurs through heat conduction along the heating tip to the distal end. The heat loss mechanisms described above affect this process, resulting in a temperature gradient along the heating tip. Further, heat energy can be conducted away from the distal end to the housing in which the heating tip is mounted, causing problems such as an uncomfortably hot grip for the user and degradation of the electrical components. Because typical resistive heating coils consist of round wires coiled around the heating tip, much of the heat radiated from the wires is not necessarily toward the tip, reducing efficiency.

In an attempt to maintain a constant tip temperature despite unpredictable heat losses from the tip and temperature gradients along the heated tip, U.S. Pat. No. 5,043,560 describes a heated probe in which the resistive heating element is encased inside the heated probe tip, and a thermocouple is placed at one end of the resistive heating element to monitor the temperature. While this reduces some of the problems associated with the various heat loss mechanisms, heat from the heated tip may still be conducted away by the probe tip housing. Additionally, the thermocouple described in the prior art measures the temperature at the interface between the resistive heating element and the electrical conductor. Because this temperature measurement occurs at some distance from the distal end of the heated tip, it may differ substantially from the temperature at the distal end of the heated tip. Variations in environmental and use conditions can result in variations in the heat loss mechanisms described earlier, making the measurement inaccurate.

Devices using current flow through the tip to supply heat can present similar problems. To reduce the effects of the heat loss mechanisms, the device described in U.S. Pat. No. 4,527,560 attempts to utilize a current density gradient to focus heating in the distal end of the probe tip. Although this works well for small tips, the technique of U.S. Pat. No. 4,527,560 is ineffective in larger tips because the current requirement to achieve sufficient current density through the tip for adequate heating can be problematic.

SUMMARY OF THE INVENTION

It is therefore an object of this invention to provide a heated probe tip allowing temperature to be maintained at a desired level despite unpredictable variations in temperature gradients in the tip and heat loss from the tip.

It is a further object of this invention to provide a heated probe tip in which the temperature of the heating tip may be monitored at or near the actual surface to be used to supply heat.

The electrically heated probe tip includes an electrically conductive support tube having a distal end on which a heating tip is mounted through an insulative body. A heating wire surrounds a proximal portion of the heating tip. One end of the heating wire is connected to the heating tip. The heating wire is of a material that is dissimilar to the material of the material forming the heating tip to form a thermocouple junction. The heating tip is connected to a first electrical lead that extends concentrically through the support tube. A second electrical lead is connected to the support tube to supply power to the heating wire through the support tube. Current thus flows, in sequence, through tile second electrical lead, support tube, heating wire, heating tip, and first electrical lead. An outer tube concentrically surrounds the electrically conductive support tube and proximal portion of the heating tip. The outer tube has a distal end wall beyond which the distal end of the heating tip projects. The end wall makes contact with the heating tip to restrain radial movement of the heating tip.

DETAILED DESCRIPTION OF THE INVENTION

Figure 1:
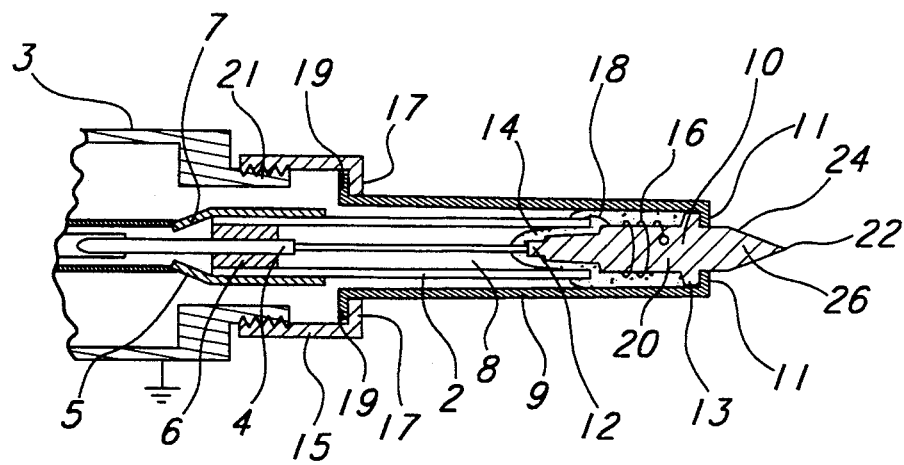
FIG. 1 is a cross-sectional view of a preferred embodiment of the device.

As shown in FIG. 1, a preferred embodiment of the device includes a tip housing 1 through which a power conductor 4 passes. The power conductor 4 is insulated from tip housing 1 by an insulator 6. Tip housing 1 contains a recess or hole 8 into which power conductor 4 extends. In a typical construction, the tip housing 1 is constructed of a rigid, conductive material such as a stainless steel tube. Fabrication of such housings is readily achievable by those skilled in the art.

Power conductor 4 is connected mechanically and electrically to a heating tip 10 at a junction 12. The heating tip 10 is constructed of an electrically and thermally conductive material. In one embodiment of the device, both the power conductor 4 and heating tip 10 are constructed of copper. The power conductor 4 and heating tip 10 are preferably constructed of like materials, reducing thermoelectric effects at the junction 12.

The heating tip 10 is held in place by an insulator 14. Insulator 14 also provides electrical and thermal insulation between the heating tip 10 and tip housing 1. In the preferred embodiment of the device, insulator 14 is made of a ceramic material. Encased within the insulator 14 is a resistive heating element 16 which surrounds the heating tip 10. It is an advantage of the device that the insulator 14 limits heat flow from the resistive heating element 16 and heating tip 10 to the tip housing 1, reducing heat loss to the tip housing 2 and consequently improving heating efficiency of the inventive device. While the heating element 16 consists of a resistive coil in the preferred embodiment of the device, alternate types of heating elements can be used, such as linear elements placed parallel to the heating tip 10, a spiral resistive ribbon as described below, or a resistive film layer.

Heating element 16 is connected electrically to the tip housing 1 at a junction 18. The heating element 16 and tip housing 1 are preferably of like materials, reducing thermoelectric effects at the junction 18.

The distal end of the heating element 16 is connected electrically to the heating tip 10 at the thermocouple junction 20, preferably near to a distal end 22 of the heating tip 10. A distal surface 24 of the heating tip 10 is coated with a transition material 26. In the preferred embodiment, the transition material 26 is an iron plating over a copper base which completely coats the heating tip 10. The transition material 26 provides an advantageous interface between distal surface 24 and a material to which the probe is intended to transfer heat and improves solder wetting over uncoated tips.

In the preferred embodiment of the device, junction 18 and thermocouple junctions 20 are formed using spot-welding techniques well known in the art. Alternatives to spot-welding, such as high temperature soldering, can be used to form junction 18 and thermocouple junction 20. Iron plating facilitates spot-welding as compared to unplated copper, because rapid heat dissipation by uncoated copper makes spot-welding difficult. In the preferred embodiment of the device, the heating element 16 and heating tip 10 are chosen to be of differing materials, causing a thermocouple to be formed at the thermocouple junction 20. By making the heated tip 10 a part of the thermocouple junction 20, the thermocouple junction 20 can more accurately and quickly follow changes in the temperature of the heating surface 24 as temperature will be measured where the heat is being generated and used. As mentioned above, the resistive heating element 16 and the tip housing 1 are of a first material, and the power conductor 4 and the heating tip 10 are of a second material. As a result, the inventive device uses substantially only two materials to implement both the heating and the temperature sensing functions, thus simplifying its manufacture.

The probe tip is mounted in a device body 3 with the base of tip housing 1 rigidly mechanically connected to the device body 3. As shown in FIG. 1, mechanical interconnection is achieved by inserting the base end of the tip housing 1 in an aperture between the compressive retainers 5 and 7, with the tip housing 1 being held in place by the compressive force from the compressive retainers 5 and 7.

For added structural strength, a tip brace 9 surrounds a portion of tip housing 1 and heating tip 10. An upper brace lip 11 is formed at the distal end of the tip brace 9 to limit motion of the heating tip 10 by providing a barrier to a heating tip ridge 13.

The tip brace 9 is replaceably mounted to device body 3 by a retaining nut 15 having a retaining lip 17 which abuts a lower brace lip 19. The retaining nut 15 is secured to the device body 3 by tightening around the threaded end 21 of the device body 3. The retaining nut 15 may also be of a compression type, known in the art, to increase the compressive force of the compressive retainers 5 and 7.

Other securing means, such as soldering, threading, using set screws, and using epoxies or ceramics, will be obvious to those skilled in the art. Other bracing techniques, such as use of a surrounding solder or epoxy material will also be obvious. While the use of a structural strengthening brace is advantageous, a device excluding a brace is within the scope of the invention.

The probe tip is heated by applying electrical power between the power conductor 4 and the tip housing 1. The power source could either be an AC or a DC source. It is advantageous to reference the power conductor 4 to ground. When the power conductor 4 is referenced to ground, the heating tip 10 is held at or close to ground, allowing current flow to a soldered object to be minimized by simultaneously grounding the soldered object. A separate ground conductor connecting to the heating tip 10 may be used to further reduce the tip voltage relative to ground.

Figure 2A:
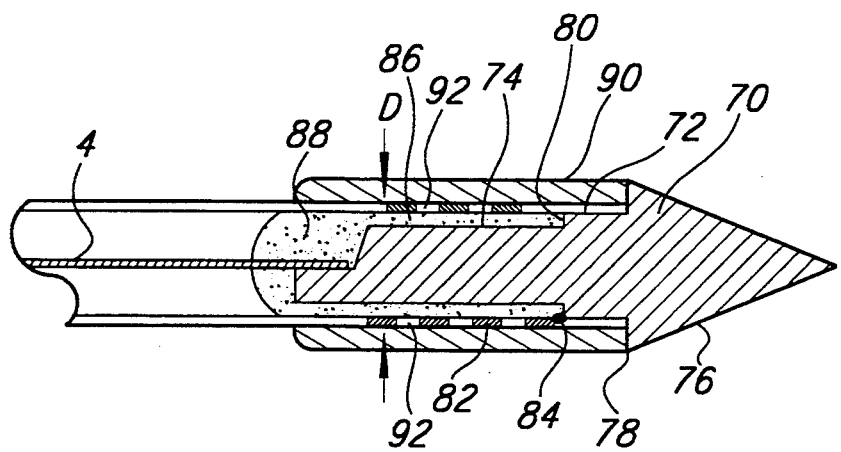
FIG. 2A is a cross-sectional view of a second preferred embodiment of the device.
Figure 2B:
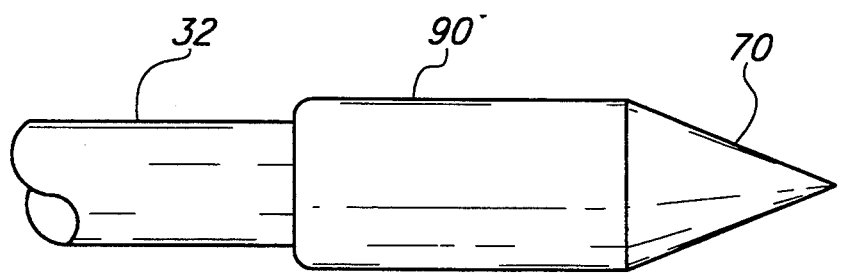
FIG. 2B is a plan view of the second preferred embodiment of the device.

A second preferred embodiment is shown in FIGS. 2A–2B. In the second preferred embodiment, the heating tip 70 is connected to the power conductor 4 in a known manner, such as spot-welding. The heating tip 70 has an intermediate diameter section 72 between a reduced diameter section 74 and a tip section 76. At the interface between the tip section 76 and the intermediate diameter section 72 a step 78 is formed. A second step 80 is formed at the interface between the reduced diameter section 74 and the intermediate diameter section 72. A resistive ribbon spiral 82 having an internal diameter D sufficient to fit snugly around the intermediate diameter section 72 surrounds a portion of the heating tip 70. The resistive ribbon spiral surrounds and engages intermediate diameter section 72. An electrical connection 84 is formed between the resistive ribbon spiral 82 and the tip 70 in a manner known in the art, such as spot-welding or soldering. The resistive ribbon spiral 82 extends from the intermediate diameter section 72 along the reduced diameter section 74. The gap 88 are filled with an electrically insulating material 86 such as a ceramic. A second layer of insulating material 90 surrounds a portion of the resistive ribbon spiral and tip.

The embodiment of FIGS. 2A -2B is produced by connecting the tip 70 to the power conductor 4 and surrounding them with an insulating material, such as a ceramic cement. A thin walled tube of a resistive material, such as stainless steel, having an internal diameter D is then press fit onto the intermediate diameter section 72 and is further secured by spot-welding or soldering. The thin walled tube 32 is then cut, in a manner known in the art, in a spiral pattern leaving a continuous gap 92 forming the resistive ribbon spiral 82. The second layer of insulating material is then formed around a portion of the resistive ribbon spiral and the tip from a material such as a ceramic epoxy. After the heating tip 70 is connected to the power conductor 4 and the spiral resistive ribbon 82, it can be inserted in a housing as described with respect to the embodiment of FIG. 1, or may be incorporated in a device in a manner known in the art such as through spot-welding and/or use of ceramic epoxies.

It is an advantage of the device that electrical connections are formed between the power conductor 4, the heating tip 70 and the thin walled tube 32 prior to formation of the gap 92. This permits the resistance of the circuit formed by the power conductor 4, the tip 70 and the resistive ribbon spiral 82 to be monitored as the resistive ribbon spiral is formed. This permits devices to be produced having the desired resistivity. The resistivity could, for example, be varied to produce a non-uniform heating along the length of the heater if desired.

It is a further advantage of this embodiment that the resistive ribbon spiral 82 has a relatively large surface area in thermal contact with the heating tip 70. This permits more efficient transfer of heat to the heating tip 70 as compared to the standard wound wire resistive heaters.

While the resistive ribbon spiral 82 is described herein as being in mechanical and electrical contact with the heating tip 70, such contact is not required. It is within the scope of the invention to position the resistive ribbon spiral 82 in thermal contact with the heating tip 70, but to supply power to the resistive ribbon spiral through separate conductors.

Temperature of the device can also be monitored and controlled using techniques known in the art, as described below with reference to the alternative embodiment of FIGS. 3 and 4.

In an alternative embodiment of the device, shown in FIG. 3 and 4 a replaceable heating tip 29 contains a recess 28 into which a heating and sensing structure 30, described in more detail below, extends. Protruding from the heating and sensing structure 30 is an extension 33 which extends into thermocouple recess 34 of the replaceable heating tip 29. Heat is applied to an external object through a heating surface 64 and temperature is sensed at a thermocouple junction 36, which is located at distal end of extension 33. The heating surface 64 is preferably coated with a transitioning material to provide more efficient heating characteristics. The heating and sensing structure 30 is mounted to support tube 56 which is mechanically fixed relative to the tip housing 2. The replaceable heating tip 29 is retained in the recess 8 of the tip top housing 2 through a retaining screw 38. The housing 2 is preferably grounded.

Figure 3:
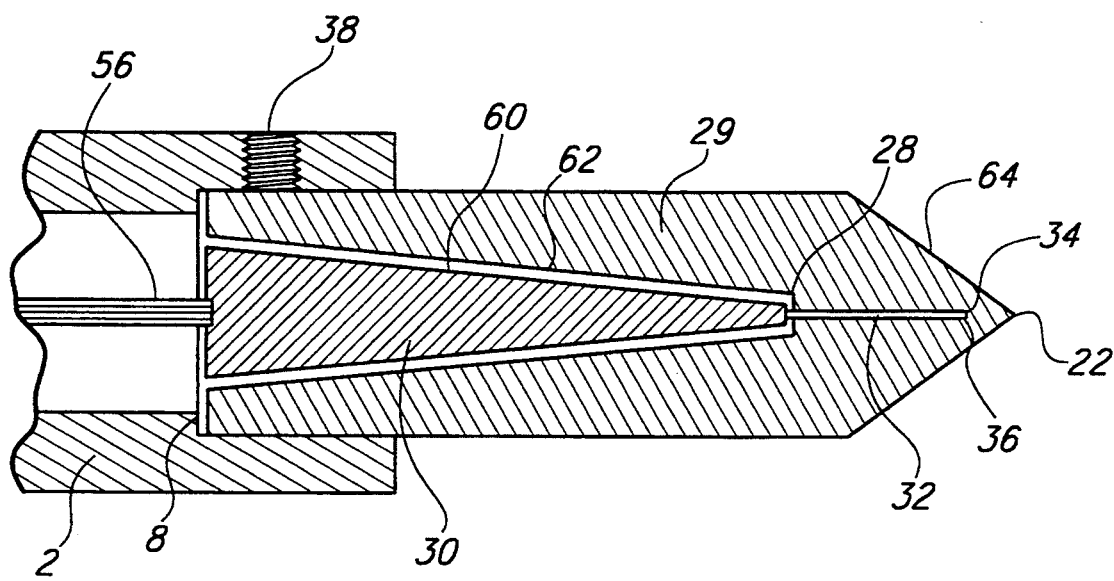
FIG. 3 is a cross-sectional view of an alternative embodiment of the device.
Figure 4:
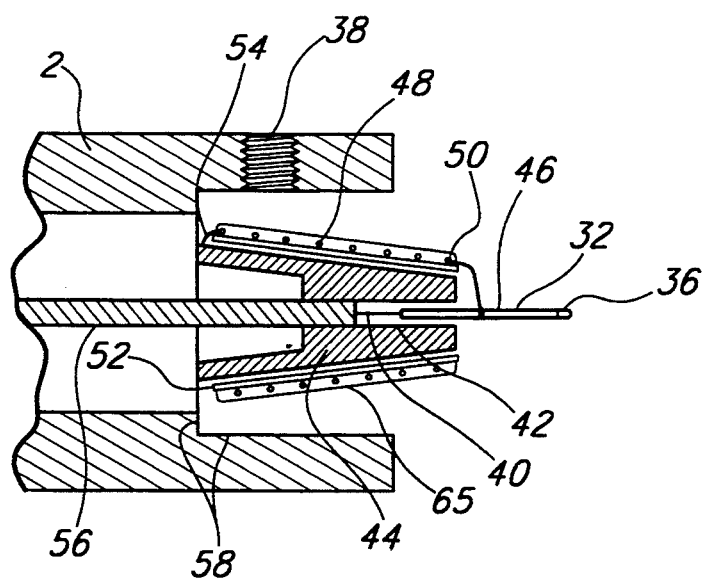
FIG. 4 is a cross-sectional view of an enlargement of a section of the alternative embodiment of FIG. 2A.

FIG. 4 shows an enlarged view of the heating and sensing structure 30 of FIG. 3. A power conductor 40 extends through the support tube 56 through a cylindrical passageway 42 of a base 44, and extends outwardly from the base 44. The power conductor 40 runs inside a heating element extension tube 46 and is connected electrically to the tube 46 at thermocouple 36. Together the tube 46 and the thermocouple 36 form the extension 33. The materials of the power conductor 40 and the heating element extension tube 46 are chosen such that the electrical connection forms the thermocouple 36. The heating element extension 46 is connected electrically to one end of the heating element 48 at a junction 50. The junction 50 is formed by spot-welding, but other techniques of making this connection will be obvious to those skilled in the art.

A heating element 48 surrounds a conical base 44 and is insulated from the conical base 44 by a first ceramic insulating layer 52. The heating element 48 is a resistive coil, but other types of heating elements will be obvious to those skilled in the art. The proximal end of the heating coil 48 is connected electrically to the conical base 44 through a jumper wire 54. Electrical connection to the conical base 44 is achieved through the support tube 56. The support tube 56 surrounds, but is insulated from, the power conductor 40. Electrical power is supplied to the probe tip through power conductor 40 and the support tube 56 so that current passes through the power conductor 40 to thermocouple 36 and heating element extension 46 to heating coil 48. As current passes through the heating coil 48, resistive heating occurs, thereby heating the replaceable heating tip 29 (FIG. 3) surrounding the coil 48. The electrical circuit is completed as current passes through a jumper 54 and the base 44 to the second conductor 56. A second ceramic insulating layer 65 surrounds the heater providing mechanical and electrical insulation between the heater coil 48 and the replaceable tip 29.

Referring again to FIG. 3, the device is assembled by inserting the replaceable heating tip 29 in the recess 8 such that the replaceable heating tip 29 surrounds the heating and sensing structure 30. In the preferred embodiment of the device, a recess 60 of the replaceable heating tip 29 is conical and slightly larger than the cone formed by the heating and sensing structure 30 such that the resistive heating element 48 (shown in FIG. 4) is located near to internal surface 62 of the recess 60 of FIG. 3, allowing efficient heat transfer from the resistive heating element 48 to the replaceable heating tip 29.

In use, a distal end 22 and a distal surface 64 are applied to an external object so that heat is conducted from the replaceable heating tip 29 to the external object.

Temperature monitoring of the replaceable heating tip 29 is achieved through use of the thermocouple 36. The thermocouple 36 generates a voltage proportional to its temperature which, using techniques known in the art, is monitored and fed back to a controlling apparatus. The controlling apparatus then adjusts the current supplied to the resistive heating element 48 to maintain the voltage at thermocouple 36 relatively constant. For example, current flow can be increased, thereby causing additional heat to be supplied to the replaceable heating tip 29 when a temperature reduction is sensed at thermocouple 36. The thermocouple 36 extends to a location well within replaceable heating tip 29. As a result, temperature at the thermocouple is shielded partially from direct heat radiation from the resistive heating element 48 providing an increased accuracy in temperature measurement. Additionally, inclusion of a narrow thermocouple recess extending into replaceable heating tip 29 allows temperature measurement proximate to the distal end 22 with little sacrifice of strength or heat conductivity due to narrowing of the thermally conductive material comprising replaceable heating tip 29.

It is a further advantage of the device that the replaceable heating tip 29 is a replaceable element allowing worn tips to be replaced. It can be seen readily that in some applications a fixed nonreplaceable tip may be preferred for reasons such as performance, precision of alignment, or manufacturing ease.

While preferred heated probe tips have been described, those skilled in the art will readily recognize modifications that may be made to the embodiments disclosed. For example, power conducted via the support tube 56 of the heated probe tip need not be routed through the central passageway 8 and retaining screw 38 could be replaced by a number of tip retention mechanisms. These modifications are intended to be a part of the invention if they use the underlying concepts of this invention. The claims of this invention should be interpreted to the extent allowable by reference to the description and to the prior art. The preferred embodiments disclosed should be used by way of limitation only to the extent necessary to define the invention. For example, the conical heating and sensing element may be cylindrical rather than conical if manufacturing or other considerations dictate. Similarly, noncylindrical passageways and tips may be utilized where they are more appropriate for a given use.

It is claimed:

1. An electrically heated probe tip comprising:
   an electrically conductive support tube having a distal end;
   an insulative body mounted at the distal end of said support tube;
   a heating tip of an electrically and thermally conductive first material mounted in said insulative body, said heating tip having a proximal portion and a distal portion;
   a heating wire surrounding the proximal portion of said heating tip, said heating wire having a first and second ends, the first of which is connected to said heating tip and the second of which is connected to said electrically conductive support tube, said heating wire being of a second material that is dissimilar to said first material so that the connection between said heating wire and said tip form a thermocouple junction;
   a first electrical lead extending concentrically through said support tube, said first electrical lead being connected to said heating tip;
   a second electrical lead connected to said electrically conductive support tube; and
   an outer tube concentrically surrounding said electrically conductive support tube and the proximal portion of said heating tip, said outer tube having a distal end wall contacting said heating tip with the distal portion of said heating tip projecting beyond said distal end wall.

2. The electrically heated probe tip of claim 1 wherein said heating tip includes an outwardly extending annular ring positioned proximally of the distal end wall of said outer tube with a proximal surface of said end wall contacting said annular ring so that said end wall restrains said heating tip from axial movement.

3. The electrically heated probe tip of claim 1 further including a cylindrical device body having a reduced diameter cylindrical flange projecting distally therefrom, and wherein said outer tube includes a cylindrical mounting flange that fits over and mates with the cylindrical flange of said device body.

* * * * *